United States Patent Office 3,212,898
Patented Oct. 19, 1965

3,212,898
PHOTOSENSITIVE COMPOSITIONS OF MATTER COMPRISING PHOTOCHROMIC MATERIALS SUSPENDED IN POLYESTER BINDERS
John J. Cerreta, Monroe, Conn., assignor to American Cyanamid Company, Stamford, Conn., a corporation of Maine
No Drawing. Filed Nov. 21, 1962, Ser. No. 239,333
6 Claims. (Cl. 96—90)

This invention relates to novel compositions of matter. More particularly, this invention relates to novel compositions of matter comprising polyester resins having uniformly dispersed throughout the body thereof, a photochromic benzospiropyran compound. Still more particularly, this invention relates to novel compositions of matter comprising thermoplastic and thermosetting polyester resins produced from polycarboxylic acids and polyhydric alcohols having uniformly dispersed throughout the body thereof, a specific group of photochromic benzospiropyran compounds.

The use of photochromic materials as the active ingredients in such articles as data storage devices, reflectants for incident high-intensity radiation, photochemical printing and the like is well known in the art. However, to my knowledge, there has been no disclosure of the production of compositions of matter comprising highly stable, very sensitive, rapid color-changing photochromic compounds uniformly dispersed throughout polyester resins produced from polycarboxylic acids and polyhydric alcohols.

I have discovered that certain photochromic materials may be incorporated directly and uniformly into polyester resins by physically blending the polyester resin with the photochromic material. Surprisingly, I have found that the photochromic material functions, as such, when the polyester is in the form of a solid media. That is to say, generally the photochromic spiropyrans are not photochromic in the solid state but only in solution, at room temperature and below. However, I have found that even when placed in a solid polyester resin they unexpectedly continue to exhibit all of their photochromic properties even though they are not present as a solution.

Previous to my invention, photochromic materials of this type were used only as encapsulated active organic solutions or as photochromic solutions per se, in view of their known tendency to function photochromically only in solution at room temperature and below. I have found that the hereinbelow mentioned photochromic materials unexpectedly continue to exhibit their color reversible phenomena even after having been uniformly dispersed throughout polyester resins. I have therefore produced novel compositions of matter composed of polyester resins containing photochromic spirobenzopyran materials in uniform molecular distribution. These compositions are capable of the infinite resolution of data, images or designs and are useful in the production of various articles heretofore not producible utilizing known compositions of the prior art.

The prior art devices of this type have many deficiencies and present certain problems which have heretofore been very difficult, if not impossible, to overcome. In regard to various commercially available storage devices and photographic instruments, for example, the light sensitive material used therein must be prevented from coming into contact with white light, such as by storage in the dark or by coating the material with a protective film such as gel or tin foil etc. The products of my invention however, in order to be transformed back to their true color from the color attained by contact with ultraviolet light, need only be removed from the light a short period of time before use. Additionally, many prior art devices decompose rapidly because of their relatively poor stability and therefore must be used within a certain time after their manufacture. My novel compositions, however, are very stable, easily handled, and can be stored for great lengths of time without fear of permanent damage by white light while still possessing all the properties necessary and desired for the above-enumerated uses.

The novel compositions of the present invention are moldable, castable, etc., by known techniques into different forms such as discs, plates, films, foils, and the like. Since the color change of the photochromic materials, more fully discussed hereinbelow, is evident in the solid state, in admixture with the polyester resins the necessity of laminated construction, encapsulation and/or solution usage, and their accompanying disadvantages, have therefore been overcome by my novel compositions.

It is an object of the present invention to provide novel compositions of matter.

It is a further object of the present invention to provide novel compositions of matter comprising polyester resins having uniformly dispersed throughout the body thereof, a photochromic benzospiropyran compound.

It is a further object of the present invention to provide novel compositions of matter comprising thermoplastic and thermosetting polyester resins produced from polycarboxylic acids and polyhydric alcohols having uniformly dispersed therethrough, a specific group of color reversible photochromic benzo spiropyran compounds.

These and other objects will become more apparent to those skilled in the art upon reading the more detailed description of the present invention set forth hereinbelow.

As mentioned above, molecules or complexes which undergo reversible photo-induced color changes are termed photochromic systems. That is to say, in the absence of activating radiation, the system has a single stable electronic configuration with a characteristic absorption spectrum. When the system is contacted with ultraviolet irradiation the absorption spectrum for the system changes drastically, but when the irradiation source is removed the system reverts to its original state.

Photochromism has been observed in inorganic and organic compounds both in solution and solid state. Although the exact mechanism of color change varies markedly in each individual system, there are two processes which account for most types of photochromic phenomena. The first process is the transformation of excited state electronic energy into vibrational and tortional twisting modes of the molecule. Usually, systems observed to be photochromic have very efficient routes for internal transformation of absorbed energy and are generally never fluorescent or phosphorescent. Internal transformation often takes place very rapidly, that is to say, the primary process in the photo production of a colored species often occurs in about a millimicrosecond. However, optical observation of the colored species normally takes considerably longer than this because of the very small amounts of colored material produced per unit time and the depletion of the color by the competing reverse reaction.

The second fundamental photo-electronic mechanism generally considered as producing photochromism is charge transfer. Most charge transfer phenomena in organic molecules are rapidly reversible and therefore produce no colored intermediate. However, in inorganic crystals, charge transfer absorption usually leads to a colored state in which the donor-acceptor crystals have been oxidized and reduced.

There are three major factors which govern the behavior of a photochromic system.

A. ABSORPTION OF INCIDENT RADIATION

According to the quantum theory, each absorbed quantum creates one activated molecule and only absorbed radiation can produce a chemical change. Variables which control the number of photons absorbed include the concentration and extinction coefficient of the photochrome, the cell length, the screening coefficients of other components of the system, and the wavelengths of the incident radiation.

B. QUANTUM YIELD

All excited molecules will not undergo transformation to the colored form, so that the quantum yield will generally be less than unity. Various deactivating processes which compete for the excited molecules include fluorescence, phosphorescence, permanent chemical change and thermal release.

C. THE REVERSE REACTION

In both the forward and reverse reactions, the concentration of the colored form is dependent on the intensity of the radiation, the kinetics of the reverse reactions, and temperature and solvent sensitivity of the reactions. The kinetics for the reverse reaction will normally be controlling, however some reverse reactions are thermally sensitive and are accelerated by irradiation.

The terms "photochromic compound," "photochromic substance" or "photochromic material," as used in the instant disclosure, mean compounds, substances, or materials wrich change their transmission or reflectance upon being subjected to ultraviolet light or visible irradiation and subsequently revert to their original color state upon subjection thereof to a different wavelength of radiation, or removal of the initial ultraviolet light source.

The ability of various materials to change color and to then revert back to their original color is not a new phenomenon. In fact, such compounds have been widely used in various ways, as described above. Generally these compounds change their color when exposed to ordinary sunlight and revert back to their original color upon removal thereof from the rays of the sun. Various other materials however, change color only when subjected to a certain degree of irradiation, and as such, sunlight will not effect them. High intensity radiation, such as 10–25 cal./cm.$^2$/sec. or more is necessary in regard to these compounds, while sunlight (0.2 cal./cm.$^2$/sec.) will affect the former.

The benzospiropyran compounds which are useful as the photochromic additives of the present invention are well known in the prior art and include the following compounds:

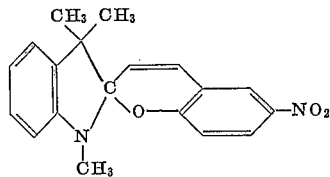

1′,3′,3′-trimethyl-6-nitro-spiro(2H-1-benzopyran-2,2′-indoline)

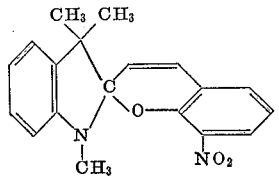

1′,3′,3′-trimethyl-8-nitro-spiro(2H-1-benzopyran-2,2′-indoline)

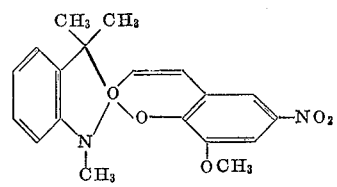

1′,3′,3′-trimethyl-6-nitro-8-methoxy-spiro(2H-1-benzopyran-2′,2′-indoline)

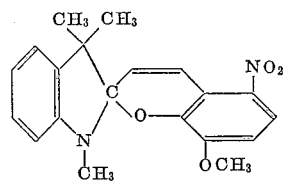

1′,3′,3′ - trimethyl-5-nitro-8-methoxy-spiro(2H-1-benzopyran-2,2′-indoline)

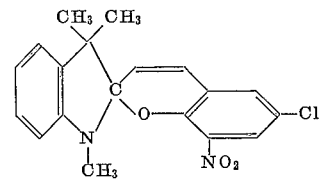

1′,3′,3′ - trimethyl - 6 - chloro-8-nitro-spiro(2H-1-benzopyran-2,2′-indoline) and

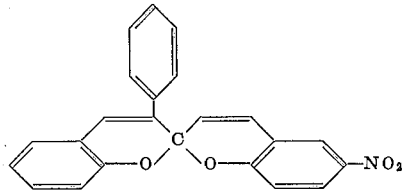

3′-phenyl - 6 - nitro-spiro(2′H,1′-benzopyran-2,2′[2H,1-benzopyran]).

These compounds and methods for the preparation thereof, are disclosed in U.S. Patents 2,953,454 and 3,022,318 and these patents are hereby incorporated into the instant specification by reference.

A preferred group of the benzospirapyran compounds, preferred because of their ability to change color at a faster rate than those mentioned previously, are also useful in the present invention. These compounds are those having the formula (I)

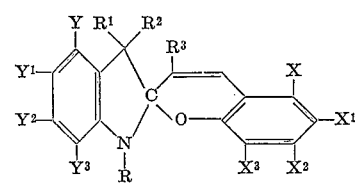

wherein R, $R^1$ and $R^2$ represent the same or different alkyl radicals having 1 to 20 carbon atoms, inclusive, and $R^1$ and $R^2$ taken together form a saturated carbocylic ring, $R^3$ is hydrogen or an alkyl radical having 1 to 20 carbon atoms, inclusive, X, $X^1$, $X^2$, $X^3$, Y, $Y^1$, $Y^2$ and $Y^3$ represent hydrogen, an alkoxy radical having 1 to 4 carbon atoms, inclusive, a nitro radical or a halogen radical, and the pairs Y and $Y^1$, $Y^1$ and $Y^2$, $Y^2$ and $Y^3$, X and $X^1$, $X^1$ and $X^2$ or $X^2$ and $X^3$, when taken together, form a conjugated aromatic ring, no more than three of said X, $X^1$, $X^2$ and $X^3$ and no more than three of said Y, $Y^1$, $Y^2$ and $Y^3$ being hydrogen.

Examples of the compounds which correspond to

Formula I include 1',3',3'-trimethyl - 5',6 - dinitrospiro-(2H-1-benzopyran-2,2'-indoline), 1',3',3'-trimethyl-5',6-dinitro - 8 - methoxy-spiro(2H-1-benzopyran-2,2'-indoline), 1',3',3'-trimethyl-5',8-dinitro - 6 - methoxy-spiro-(2H - 1 - benzopyran-2,2'-indoline), 1',3',3'-tributyl-8-chloro - 6' - butoxy-spiro(2H-1-benzopyran-2,2'-indoline), 1'-octyl-3'-methyl-3'-ethyl-3-propyl-4',7-diethoxy-spiro(2H-1-beingopyran-2,2'-indoline, 1',3',3'-tristearyl-3-butyl-5,6-benzo - 6' - fluoro-spiro(2H-1-benzopyran-2,2'-indoline), 1',3',3'-trimethyl - 6 - nitro-6',7'-benzo-spiro-(2H-1-benzopyran - 2,2' - indoline), 1',3',3'-triethyl-7-bromo - 4',7' - dimethoxy-spiro(2H-1-benzopyran-2,2'-indoline), 1'-methyl - 3' - cyclohexyl - 5,8 - dichloro,5'-methoxy - 7' - iodo-spiro(2H-1-benzopyran - 2,2' - indoline), and the like.

The compounds of Formula I may be produced by any known procedure. A preferred method however, is that set forth in copending application, Serial No. 239,334 filed concurrently herewith, wherein the compounds and the method of producing them are generically and specifically disclosed and claimed. Basically, said procedure comprises reacting an appropriately substituted hydrazine with a ketone having at least three carbon atoms, in the presence of a strong acid. The acid is then neutralized by adding alkali and the product (compound A) is quaternized by reacting it with an alkyl sulfate or other alkyl-containing quaternizing agent therewith. This step forms compound B which is then reacted with an equimolar amount of a basic material to produce an indole tribase. The tribase is thereafter reacted with an appropriately substituted salicylaldehyde to yield the desired benzospiropyran.

The amount of photochromic material incorporated into the polyester resin is not critical and generally depends upon the intensity of the color of the composition desired upon irradiation thereof, i.e., the more compound added, the greater the color intensity. However, a range of from about 0.01% to about 20%, by weight, preferably about 0.05% to about 5%, by weight, based on the weight of the polyester resin, of the photochromic material, may be used.

The polyester resins employed in the practice of the present invention may be either thermoplastic or thermosetting. They are all well known in the art and are prepared by reacting polycarboxylic acids, or their anhydrides, with polyhydric alcohols. The thermosetting polyseters are prepared using a procedure wherein at least one of the reactive components contains $\alpha,\beta$-ethylenic unsaturation. By following this procedure, resinous, essentially linear esterification or condensation products containing a plurality of ethylenically unsaturated linkages distributed along the backbones of their polymer chains are produced.

The use of $\alpha,\beta$-ethylenically unsaturated polycarboxylic acids provides a convenient method of introducing ethylenic unsaturation into the polyester resins. It is preferred to employ $\alpha,\beta$-ethylenically unsaturated dicarboxylic acids, such as maleic, fumaric, citraconic, $\gamma,\gamma$-dimethylcitraconic, mesaconic, itaconic, $\alpha$-methylitaconic, $\gamma$-methylitaconic, teraconic, and the like, as well as mixtures thereof, but minor amounts of $\alpha,\beta$-ethylenically unsaturated polycarboxylic acids containing three or more carboxyl groups, such as aconitic acid and the like, together with the particular $\alpha,\beta$-ethylenically unsaturated dicarboxylic acid or acids chosen, may also be used.

Whenever available, the anhydrides of any of the aforementioned $\alpha,\beta$-ethylenically unsaturated polycarboxylic acids may be substituted for said acids in whole or in part.

Any of the large class of polyhydric alcohols ordinarily used in preparing reactive polyester resins may be employed in the practice of the present invention. While dihydric alcohols, and especially saturated aliphatic diols, are preferred as co-reactants in the preparation of the polyester resins, it is not mandatory that all of the polyol used be of this type, in that small amounts, e.g., usually up to about 10% of the total equivalents of hydroxyl groups present in the esterification mixture, of polyols having more than two hydroxyl groups may also be employed. Among the dihydric alcohols which may be employed are saturated aliphatic diols such as ethylene glycol, propylene glycol, butylene glycol, diethylene glycol, dipropylene glycol, triethylene glycol, tetraethylene glycol, butanediol-1,2, butanediol-1,3, butanediol-1,4, pentanediol-1,2, pentanediol-1,3, pentanediol-1,4, pentanediol-1,5, hexanediol-1,2, hexanediol-1,3, hexanediol-1,4, hexanediol-1,5, hexanediol-1,6, neopentyl glycol and the like, as well as mixtures thereof. Among the polyols having more than two hydroxyl groups which may be employed in minor amounts, together with the above-mentioned diols, are saturated aliphatic polyols such as glycerol, trimethylol ethane, trimethylol propane, pentaerythritol, dipentaerythritol, arabitol, xylitol, dulcitol, adonitol, sorbitol, mannitol, and the like, as well as mixtures thereof.

In forming the thermoplastic polyester resins useful herein, the above alcohols are reacted with non-polymerizable polycarboxylic acids, i.e., acids which are saturated or which contain only benzenoid unsaturation, such as oxalic, malonic, succinic, glutaric, adipic, pimelic, suberic, azelaic, sebacic, malic, tartaric, tricarballylic, citric, phthalic, isophthalic, terephthalic, cyclohexanedicarboxylic, endomethylenetetrahydrophthalic, and the like, as well as mixtures thereof.

These saturated acids may be used alone to form thermoplastic resins or in combination with the above-mentioned unsaturated acids in the formation of thermosetting resins in order to impart many beneficial properties thereto. For example, non-polymerizable polycarboxylic acids having only two carboxyl groups, and no other reactive substituents, may be employed to impart a desirable degree of flexibility which may not be achieved by the use of the $\alpha,\beta$-ethylenically unsaturated polycarboxylic acids alone. Where such non-polymerizable polycarboxylic acids are employed, the amount thereof should constitute at least about 20% but not more than about 80% of the total equivalents of carboxyl groups present in the esterification mixture. Preferably, such non-polymerizable polycarboxylic acids may be employed in amounts ranging from about 25% to about 75% of the total equivalents of carboxyl groups present in the esterification mixture.

Halogenated unsaturated polycarboxylic acids may also be employed in the preparation of the thermosetting polyester resins of the present invention for purposes of imparting various desirable properties thereto as mentioned above in regard to the saturated acids. Examples of halogenated acids which may be used include monochloro- and monobromomaleic, monochloro- and monobromofumaric, monochloro- and monobromomalonic, dichloro- and dibromomalonic, monochloro- and monobromosuccinic, $\alpha,\beta$-dichloro- and dibromosuccinic, hexachloroendomethylenetetrahydrophthalic, and the like, as well as mixtures thereof. Whenever available, the anhydrides of any of these halogenated acids may also be substituted therefore in whole or in part.

Among the halogenated polyols that may be employed are 2,2'-chloromethylpropanediol-1,3, adducts of hexachlorocyclopentadiene with unsaturated polyols, such as butenediols, pentenediols, and the like, and adducts of hexachlorocyclopentadiene with polyols having three or more hydroxyl groups, one of which is etherified with an unsaturated alcohol reactive with hexachlorocyclopentadiene. Among the later are compounds such as 3-[1,4,5,6,7,7 - hexachlorobicyclo - (2.2.1)-5-hepten-2-yloxy]-1,2-propanediol, which is the adduct of hexachlorocyclopentadiene with vinyl glycerol ether, 3-[1,4,5,6,7,7-hexachlorobicyclo-(2.2.1) - 5-hepten-2-yl] - methoxy-1,2-propanediol, which is the adduct of hexachlorocyclopentadiene with allyl glycerol ether, adducts of hexachlorocyclopentadiene with vinyl and allyl ethers of pentaerythritol, and the like. Mixtures of these halogenated polyols may also be employed, if desired.

The esterification mixtures, from which both the thermoplastic and the thermosetting polyester resins employed in the practice of the present invention are prepared, are generally formulated so as to contain at least a stoichiometric balance between carbonyl and hydroxyl groups. Thus, where a diol and a dicarboxylic acid are employed, they are usually reacted on at least a mol to mol basis. In common commercial practice, a small excess of polyol, usually in the range of from about 5% to about 15% excess, is employed. This is done primarily for economic reasons, i.e. to insure a rapid rate of esterification.

Both types of polyester resins used in the practice of the present invention are formed in the manner customarily observed in the art. Thus, the particular polycarboxylic acid or acids and polyol or polyols employed are reacted at elevated temperatures and atmospheric pressure. Since resinifying reactants of this type are prone to develop undesirable color when in contact with air at elevated temperatures, it is generally considered good practice to conduct the esterification reaction in an inert atmosphere, such as can be obtained by bubbling an inert gas, e.g., carbon dioxide, nitrogen, and the like, through the esterification mixture. The reaction temperature is not critical, thus the reaction will preferably be carried out at a temperature which usually will be just below the boiling point of the most volatile component of the reaction mixture, generally the polyol.

The esterification mixture should be sufficiently reacted so as to ultimately produce a polyester resin having an acid number not appreciably more than about 75. It is preferred to employ polyester resins having acid numbers ranging from about 30 to about 50.

Further details pertaining to the preparation of polyester resins of the types employed in the practice of the present invention are disclosed in U.S. Patent No. 2,255,313, to Ellis, and in U.S. Patents Nos. 2,443,735 to 2,443,741, inclusive, to Kropa and these patents are hereby incorporated into the present application by reference.

The thermosetting polyester resins of the present invention, in combination with the photochromic benzospiropyrans, may be cross-linked by the addition of a suitable cross-linking agent.

The polyester resins are cross-linked by admixing them with a monomer compound containing the polymerizable $CH_2=C<$ group to give a composition that may be cured to a stable thermoset condition. One may use about 10 parts by weight of the monomeric material to about 90 parts by weight of polyester resin up to about 60 parts of the monomeric material to about 40 parts of the polyester resin. The preferred embodiment, however, is to use from about 25 parts of the monomeric material to about 35 parts of the monomeric material with about 75 parts to about 65 parts, respectively, of the polyester resin.

The monomeric material containing the polymerizable $CH_2=C<$ group which may be used in the practice of the present invention, has a boiling point of at least 60° C. Among the polymerizable monomeric materials that will find use in my invention are those such as styrene, side chain alkyl and halo substituted styrenes such as alpha methylstyrene, alpha chlorostyrene, alpha ethylstyrene and the like or alkyl and halo ring-substituted styrenes such as ortho, meta and paraalkyl styrenes such as o-methylstyrene, p-ethylstyrene, meta-propylstyrene, 2,4-dimethylstyrene, 2,5-diethylstyrene, bromostrene, chlorostyrene, dichlorostyrene, and the like. Still further, one can make use of the allyl compounds such as diallyl phthalate, tetrachlorodiallyl phthalate, allyl alcohol, methallyl alcohol, allyl acetate, allyl methacrylate, diallyl carbonate, allyl lactate, allyl alphahydroxyisobutyrate, allyl trichlorosilane, allyl acrylate, diallyl malonate, diallyl oxalate, allyl gluconate, allyl methylgluconate, diallyl adipate, diallyl sebacate, diallyl citraconate, the diallyl ester of muconic acid, diallyl itaconate, diallyl chlorophthalate, diallyl dichlorosilane, the diallyl ester of endomethylene tetrahydrophthalic anhydride, the diallyl ester of tetrachloro endomethylene tetrahydrophthalic anhydride, triallyl tricarballylate, triallyl aconitate, triallyl cyanurate, triallyl citrate, triallyl phosphate, trimethallyl phosphate, tetraallyl silane, tetraallyl silicate, hexallyl disiloxane and the like. These monomeric materials may be used either singly or in combination with one another.

When the thermosetting polyester resin is combined with the cross-linking monomeric material, it is desirable to incorporate therein a polymerization inhibitor in order to prevent premature gelation of the resinous composition, particularly if it is expected that said composition will be subjected to prolonged periods of storage or if it is expected that it will be subjected to temperatures significantly higher than room temperature. With the polymerization inhibitor, the resinous composition will remain stable at room temperature for months without noticeable deterioration. Amongst the polymerization inhibitors which may be used are any of those which are conventionally known and used in the art such as hydroquinone, benzaldehyde, ascorbic acid, isoascorbic acid, resorcinol, tannin, symmetrical (di-(beta-naphthyl)-p-phenylene diamine, phenolic resins, sulfur compounds and the like. The concentration of the inhibitor is preferably and as a general rule less than 1% by weight is usually sufficient. However, with the preferred inhibitors, e.g., polyhydric phenols and aromatic amines, one may make use of such small amounts as 0.01%–0.1% by weight.

The compositions of the present invention will find application in a great plurality of fields such as in the preparation of laminates and other reinforced plastics, coating compositions, adhesive compositions, molding compositions, potting, films, foils, fibres and the like.

The thermosetting polyester resins can readily be solidified without benefit of catalyst by the application of heat or by the application of heat and pressure. However, in such an operation without benefit of a catalytic agent the time element makes it desirable to incorporate into the composition conventional polymerization catalysts such as the organic superoxides, the alcoholic and acidic peroxides. Among the preferred catalyst are: the acidic peroxides, e.g., benzoyl peroxide, phthalic peroxide, succinic peroxide and benzoyl acetic peroxide; fatty oil acid peroxides, e.g., coconut oil acid peroxides, lauric peroxide, stearic peroxide and oleic peroxide; alcohol peroxides, e.g., tertiary-butyl hydroperoxide, usually called tertiary-butyl peroxide and terpene oxides, e.g, ascaridole. Still other polymerization catalyst might be used in some instances, e.g., soluble cobalt salts (particularly the linoleate and naphthenate), p-toluene sulfonic acid, aluminum chloride, stannic chloride and boron trifluoride and azobisisobutyronitrile.

As mentioned above, the method used to prepare the polyester resins used in the formation of the novel compositions of the present invention is not critical and any known method may be used. The only criteria which must be followed in adding the benzospiropyran compound to the polyester resin is in regard to the residual acid or anhydride present in the polyester after the production thereof. The benzospiropyran photochromic material cannot be added to the polyester formulation until substantially all of the residual, free acid and/or anhydride present therein is removed, since the acid and/or anhydride tends to react or neutralize the benzospiropyran compound thereby nullifying its reversible color change ability. The residual acid and/or anhydride present in the polyester as produced, may be removed therefrom by washing the resin with a basic material such as sodium hydroxide, potassium hydroxide, sodium carbonate and the like at a temperature ranging from 15–25° C., although other methods are equally as applicable. After the removal of substantially all the residual acid and/or anhydride, the polyester resin may then be blended with the photochromic benzospiropyran material. Known procedures such as utilizing a ball mill, a tumbler mixer, hot rolls, emulsion blending techniques, a Banbury mixer, or various other blendors and the like are effective for this blending. Another procedure which may be employed is a devolatilization-extrusion method, wherein separate streams of solutions of the polyester resin and photochromic material are subjected to mixing, compounding, devolatilization and extrusion in commercially available devices. In the devolatilizer-extruder, the mixture is worked in a chamber under heat and vacuum so that new surfaces of the resin mixture are continuously and rapidly exposed to vacuum to remove the solvent before extruding the product. The term "devolatilization" as herein employed refers to the step in which the nonresinous volatile material is removed from the solution of the resin. The apparatus which simultaneously devolatilizes and extrudes the material comprises a chamber with one or more screws having a close tolerance with the wall for compounding the material in its passage therethrough, and at least one vacuum chamber for removing the volatile components of the feed. The action of working the material under the close tolerance of the screws not only intimately blends the mixture, but generates substantial heat which aids in the devolatilizing of the blend.

The devolatilizer-extruder may contain one or more interconnected sections, at least one being under vacuum. A preferred treatment wherein the material is worked for a total time of from about 1 to 5 minutes, employs two vacuum sections. In addition to the vacuum sections, the devolatilizer-extruder may contain a section following the vacuum sections which is atmospheric, i.e., not under vacuum, wherein various volatiles or non-volatile modifiers, fillers, lubricants, stabilizers, plasticizers, colorants or the like, may be incorporated into the novel compositions of this invention and extruded therewith.

The vacuum sections of the devolatilizer-extruder are heated to temperatures of from about 110° C. to 200° C. and maintained under vacuum at an absolute pressure of from about 5 mm. to about 200 mm. mercury. Preferably, the temperature of the sectionally heated apparatus is maintained at from about 160° C. to about 190° C. and the vacuum is preferably maintained at from about 5 mm. to 90 mm. mercury absolute pressure. As the two streams are introduced into the devolatilizer-extruder the increased temperature causes volatilization of the solvent therefrom. At the same time, because the extruder is maintained at subatmospheric pressures, the volatile material is withdrawn or volatilized from solutions of resin and photochromic material.

As mentioned above, the compositions of the invention have many uses some of which are memory devices such as optical analogue computers, devices for temporary data storage, temporary ocillographs, temporary photographic proofs and transparencies, light storage, optical masks, wall panels, costume jewelry, toys, window display cases and the like.

The compositions of the present invention may further be modified by the addition of such materials as fillers, lubricants, plasticizers, colorants, etc. as mentioned above. It is also possible to lengthen the life of the compositions by incorporating various amounts of ultraviolet light absorbers into them or by coating the articles formed from the compositions, with a material containing an ultraviolet light absorber. When additives such as there are added, any conventional compound known to function as a UV absorber may be employed. Examples of such compounds are the 2-hydroxy benzophenones, e.g., 2,4-di-hydroxy benzophenone; the 2(2-hydroxyphenyl)benzotriazoles, e.g. 2(2 - hydroxy-4 - methoxyphenyl)benzotriazole and the like. In this manner, the photochromic life of the inorganic oxide photochromic additive is lengthened by preventing an extraneous amount of ultraviolet light from coming into contact with the photochromic material. When absorbers of this type are added, amounts up to about 20%, by weight, based on the weight of the polymer, may be used.

The following examples are set forth for purposes of illustration only and are not to be construed as limitations on the present invention except as set forth in the appended claims. All parts and percentages are by weight unless otherwise indicated.

*Example 1*

A commercially available polyester resin of maleic anhydride, phthalic anhydride and propylene glycol (14.5/46.5/39.0)

is washed three times with an aqueous solution of $NaCO_3$ at 20° C. to rid the polyester of residual anhydride therein. The polyester is then dried over calcium chloride for two hours and to 100 parts of it are added 5 parts of 1',3',3' - trimethyl - 6 - nitro - spiro - (2H - 1 - benzopyran-2,2'-indoline) and 0.25 part of azobisisobutyronitrile. To this mixture is then added 61 parts of styrene. The resultant mixture is then poured between glass plates and sealed. The plates are heated for 12 hours at 60° C. and for 1½ hours at 80° C. The resultant polyester casting turns blue upon contact thereof with ultraviolet light of 400 m$\mu$ wavelength.

Utilizing the procedure of Example 1, the following photochromic benzospiropyran compounds were added to the polyester resin identified in Example 1 in concentrations as indicated, said compounds being substituted 1',3',3'-trimethyl-spiro(2H-1-benzopyran-2,2'-indolines).

TABLE I

| Example | Substituent | Conc., parts | Color change | Ultraviolet light-wavelength, m$\mu$ |
|---|---|---|---|---|
| 2 | -8-nitro | 10 | White to blue | 350 |
| 3 | -6-nitro-8-methoxy | 15 | do | 350 |
| 4 | -5-nitro-8-methoxy | 5 | do | 350 |
| 5 | -6-chloro-8-nitro | 3 | do | 400 |
| 6 | -5',6-dinitro | 8.5 | White to deep blue | 400 |
| 7 | -5',6-dinitro-8-methoxy | 12.5 | do | 400 |
| 8 | 5',-8-dinitro-6-methoxy | 5 | do | 350 |

I claim:

1. A composition of matter comprising a residual acid free polyester resin selected from a group consisting of (1) those produced from a saturated polycarboxylic acid and a saturated polyhydric alcohol and (2) those produced from an $\alpha,\beta$-ethylenically unsaturated polycarboxylic acid, a polyhydric alcohol and a cross-linked monomer possessing a polymerizable $CH_2=C<$ group having uniformly dispersed throughout the body thereof a photochromic material selected from the group consisting of 1',3',3'-trimethyl - 6 - nitro - spiro(2H-1-benzopyran-2,2'-indoline), 1',3',3'-trimethyl - 8 - nitro-spiro(2H-1-benzopyran-2,2'-indoline), 1',3',3'-trimethyl - 6 - nitro-8-methoxy - spiro(2H-1-benzopyran-2,2'-indoline), 1',3',3' - trimethyl - 5 - nitro-8-methoxy-spiro(2H-1-benzopyran-2,2'-indoline), 1',3',3' - trimethyl-6-chloro-8-nitro-spiro(2H-1-benzopyran - 2,2' - indoline), 3'-phenyl - 6 - nitro-spiro-(2'H,1'-benzopyran-2,2'-[2H,1-benzopyran]), and those having the formula

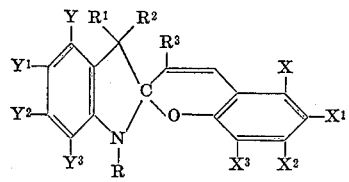

wherein R, $R^1$ and $R^2$ represent alkyl radicals having 1 to 20 carbon atoms, inclusive, and $R^1$ and $R^2$ taken together form a saturated carbocyclic ring, $R^3$ is selected from the group consisting of hydrogen and an alkyl radical having and $Y^3$ are selected from the group consisting of hydro- 1 to 20 carbon atoms, inclusive, X, $X^1$, $X^2$, $X^3$, Y, $Y^1$, $Y^2$ gen, an alkoxy radical having 1 to 4 carbon atoms, inclusive, a nitro radical and a halogen radical, and the pairs Y and $Y^1$, $Y^1$ and $Y^2$, $Y^2$ and $Y^3$, X and $X^1$, $X^1$ and $X^2$ and $X^2$ and $X^3$, when taken together, form a conjugated aromatic ring, no more than three of said X, $X^1$, $X^2$ and $X^3$ and no more than three of said Y, $Y^1$, $Y^2$ and $Y^3$ being hydrogen.

2. A composition according to claim 1 wherein the photochromic material is 1′,3′,3′-trimethyl-5′,6-dinitro-spiro(2H-1-benzopyran-2,2′-indoline).

3. A composition according to claim 1 wherein the photochromic material is 1′,3′,3′-trimethyl-5′,6-dinitro-8-methoxy-spiro(2H-1-benzopyran-2,2′-indoline).

4. A composition according to claim 1 wherein the photochromic material is 1′,3′,3′-trimethyl-5′,8-dinitro-6-methoxy-spiro(2H-1-benzopyran-2,2′-indoline).

5. A composition of matter comprising a residual acid free polyester resin selected from a group consisting of (1) those produced from a saturated polycarboxylic acid and a saturated polyhydric alcohol and (2) those produced from an α,β-ethylenically unsaturated polycarboxylic acid, a polyhydric alcohol and a cross-linked monomer possessing a polymerizable $CH_2=C<$ group having uniformly dispersed throughout the body thereof a photochromic material having the formula

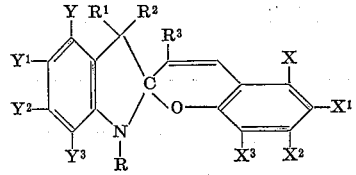

wherein R, $R^1$ and $R^2$ represent alkyl radicals having 1 to 20 carbon atoms, inclusive, and $R^1$ and $R^2$ taken together form a saturated carbocyclic ring, $R^3$ is selected from the group consisting of hydrogen and an alkyl radical having 1 to 20 carbon atoms, inclusive, X, $X^1$, $X^2$, $X^3$, Y, $Y^1$, $Y^2$ and $Y^3$ are selected from the group consisting of hydrogen, an alkoxy radical having 1 to 4 carbon atoms, inclusive, a nitro radical and a halogen radical and the pairs Y and $Y^1$, $Y^1$ and $Y^2$, $Y^2$ and $Y^3$, X and $X^1$, $X^1$ and $X^2$, $X^2$ and $X^3$, when taken together, form a conjugated aromatic ring, no more than three of said X, $X^1$, $X^2$ and $X^3$ and no more than three of said Y, $Y^1$, $Y^2$ and $Y^3$ being hydrogen.

6. A composition according to claim 1 wherein said photochromic material is 1′,3′,3′-trimethyl-6-nitro-spiro-(2H-1-benzopyran-2,2′-indoline).

References Cited by the Examiner
UNITED STATES PATENTS
| | | | |
|---|---|---|---|
| 2,953,454 | 9/60 | Berman | 96—89 |
| 3,072,481 | 1/63 | Berman et al. | 96—89 |
| 3,090,687 | 5/63 | Berman | 96—89 |

FOREIGN PATENTS
| | | |
|---|---|---|
| 1,148,351 | 5/63 | Germany. |

OTHER REFERENCES
NCR, "Theoretical and Experimental Investigation of Photochromic Memory Techniques and Devices." ASD, Technical Report 61–70, December 1961.

NORMAN G. TORCHIN, *Primary Examiner*.

UNITED STATES PATENT OFFICE
CERTIFICATE OF CORRECTION

Patent No. 3,212,898                            October 19, 1965

John J. Cerreta

It is hereby certified that error appears in the above numbered patent requiring correction and that the said Letters Patent should read as corrected below.

Column 1, line 62, for "centain" read -- certain --; column 3, line 35, for "wrich" read -- which --; column 5, line 8, for "-beingopyran-" read -- -benzopyran- --; line 47, for "polyseters" read -- polyesters --; column 10, line 54, for "cross-linked" read -- cross-linking --; column 11, lines 4 and 5, for "and $Y^3$ are selected from the group consisting of hydro-1 to 20 carbon atoms, inclusive, X, $X^1$, $X^2$, $X^3$, Y, $Y^1$, $Y^2$" read -- 1 to 20 carbon atoms, inclusive, X, $X^1$, $X^2$, $X^3$, Y, $Y^1$, $Y^2$ and $Y^3$ are selected from the group consisting of hydro- --; column 11, line 27, for "cross-linked" read -- cross-linking --.

Signed and sealed this 18th day of October 1966.

(SEAL)

Attest:

ERNEST W. SWIDER
Attesting Officer

EDWARD J. BRENNER
Commissioner of Patents